(12) United States Patent
Han et al.

(10) Patent No.: US 8,743,855 B2
(45) Date of Patent: Jun. 3, 2014

(54) METHOD OF GENERATING DATA AND TRANSMITTING SYNCHRONIZATION CHANNEL IN MOBILE COMMUNICATION SYSTEM

(75) Inventors: Seung Hee Han, Anyang-si (KR); Yeong Hyeon Kwon, Daejeon-si (KR); Jin Sam Kwak, Gunpo-si (KR); Dong Cheol Kim, Suwon-si (KR); Sung Ho Moon, Anyang-si (KR); Min Seok Noh, Seoul (KR); Hyun Woo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 841 days.

(21) Appl. No.: 12/922,049

(22) PCT Filed: Mar. 11, 2009

(86) PCT No.: PCT/KR2009/001211
§ 371 (c)(1),
(2), (4) Date: Sep. 10, 2010

(87) PCT Pub. No.: WO2009/113807
PCT Pub. Date: Sep. 17, 2009

(65) Prior Publication Data
US 2011/0007730 A1 Jan. 13, 2011

Related U.S. Application Data

(60) Provisional application No. 61/035,721, filed on Mar. 11, 2008.

(30) Foreign Application Priority Data

Jul. 17, 2008 (KR) ........................ 10-2008-0069667

(51) Int. Cl.
*H04B 7/216* (2006.01)

(52) U.S. Cl.
USPC ........... 370/342; 370/310; 370/328; 370/329; 370/330

(58) Field of Classification Search
None
See application file for complete search history.

(56) References Cited

U.S. PATENT DOCUMENTS

| 2003/0210645 | A1* | 11/2003 | Gummadi et al. | 370/203 |
| 2004/0228272 | A1* | 11/2004 | Hasegawa et al. | 370/210 |
| 2005/0002369 | A1* | 1/2005 | Ro et al. | 370/342 |
| 2006/0291583 | A1* | 12/2006 | Hammerschmidt et al. | 375/295 |
| 2007/0025245 | A1* | 2/2007 | Porras et al. | 370/229 |
| 2007/0098053 | A1* | 5/2007 | Rinne et al. | 375/149 |
| 2007/0098096 | A1* | 5/2007 | Akita et al. | 375/260 |
| 2009/0046701 | A1  | 2/2009 | Nishio et al. | |

FOREIGN PATENT DOCUMENTS

| KR | 10-2007-0120408 A | 12/2007 |
| WO | WO 2007/080976 A1 | 7/2007 |

* cited by examiner

*Primary Examiner* — Hassan Phillips
*Assistant Examiner* — Gautam Sharma
(74) *Attorney, Agent, or Firm* — Birch, Stewart, Kolasch & Birch, LLP

(57) ABSTRACT

A method for a transmitting side to transmit a sync channel in a wireless communication system using a multicarrier is disclosed. The present invention includes the steps of generating one synchronization channel including a plurality of sub-synchronization channels and the generated multicarrier symbol to a receiving side via the synchronization channel. Accordingly, the present invention enables the transmitting side to efficiently use a radio resource, thereby raising data transmission efficiency of synchronization channel.

4 Claims, 16 Drawing Sheets

METHOD OF GENERATING DATA AND TRANSMITTING SYNCHRONIZATION CHANNEL IN MOBILE COMMUNICATION SYSTEM

CROSS REFERENCE TO RELATED APPLICATIONS:

This application is the National Phase of PCT/KR2009/001211 filed on Mar. 11, 2009, which claims priority under 35 U.S.C. 119(e) to U.S. Provisional Application No. 61/035,721 filed on Mar. 11, 2008 and under 35 U.S.C. 119(a) to patent Application No. 10-2008-0069667 filed in the Republic of Korea on Jul. 17, 2008, all of which are hereby expressly incorporated by reference into the present application.

BACKGROUND OF THE INVENTION

1. Field of the Invention

The present invention relates to a mobile communication system, and more particularly, to a method of generating data and transmitting a synchronization channel in a multicarrier multiple access communication system.

2. Discussion of the Related Art

FIG. 1 is a diagram for a method of generating a signal in a transmitting side using multicarrier according to a related art.

Referring to FIG. 1, an input data sequence, $\vec{d} = [d_0, d_1, \ldots, d_{N-1}]^T$, includes N data. The input data sequence is converted to a plurality of parallel data sequences via a serial-to-parallel converting unit 100. Generally, the serial-to-parallel converting unit determines how many parallel data sequences will be generated from an input data sequence by interoperating with subcarrier modulating units 110-0 to 110-$k$ of a following inverse fast Fourier transform (hereinafter abbreviated IFFT) unit 105. In the following description, assume that a fast input data sequence is converted to k slow parallel data sequences by the serial-to-parallel converting unit 100.

The IFFT unit 105 loads mutually different subcarriers on the k slow parallel data sequences inputted to the IFFT unit 105 (i.e., subcarrier modulation) and then generates a serial IFFT transformed input data sequence using the following parallel-to-serial converting unit 110. Afterwards, the IFFT transformed input data sequence is transmitted to a receiving side via a radio frequency (RF) unit 130. In case of such a multicarrier transmission scheme as an orthogonal frequency division multiplexing (hereinafter abbreviated OFDM) scheme, the IFFT unit 105 arranges k subcarriers 110-0 to 110-$k$ respectively allocated to k parallel data sequences in a manner that the k subcarriers are orthogonal to each other on a frequency axis, whereby frequency division is achieved to avoid inter-subcarrier interference.

Generally, in a digital communication system, an input data sequence is constructed as combination of 1 and 0 and has an on/off pattern of each rectangular wave in a time domain. If Fourier transform is performed on a square wave, it can be represented as a sum of integer-fold frequency components. In particular, data representation in time domain is represented as data in frequency domain. In more particular, random digital data is represented in time domain and can be also represented in corresponding frequency domain. For details, a process for generating a multicarrier signal shown in FIG. 1 is described as follows.

First of all, if the IFFT unit 120 shown in FIG. 1 performs a procedure (i.e., subcarrier modulation) of a subcarrier having a mutually different frequency corresponding to each parallel data sequence by the corresponding parallel data sequence, a frequency of the corresponding parallel data sequence is increased by a frequency of the multiplied subcarrier in viewpoint of frequency domain. Each parallel data sequence modulated with the corresponding subcarrier enters the parallel-to-serial converting unit 105 to be represented as an input data sequence in the IFFT transformed time domain.

Formula 1 shows an input data sequence via N-size IFFT.

$$\vec{s} = [s_0, s_1, \ldots, s_{N-1}]^T = F^{-1}\vec{d}  \qquad \text{[Formula 1]}$$

In Formula 2, '$F^{-1}$' indicates an inverse Fourier transform matrix. And, the IFFT transformed input data sequence is named a multicarrier symbol. Moreover, a cyclic prefix (hereinafter abbreviated CP) can be inserted in the multicarrier symbol. The CP is formed in a manner of copying a predetermined portion of a rear part of a multicarrier and then adding the copied portion to a front part of the corresponding multicarrier symbol. Before primary data of the multicarrier symbol arrives at a receiving side, the CP eliminates influence attributed to a multipath of the received multicarrier symbol. In order to add a CP to a multicarrier symbol, a CP adding unit (not shown in FIG. 1) can be added to the IFFT unit 120. For reference, in case of using an OFDM transmission scheme as a multicarrier transmission scheme for example, frequencies of the subcarriers shown in FIG. 1 are mutually orthogonal to each other and parallel data sequences modulated with the subcarriers are mutually orthogonal to each other in frequency domain.

In the following description, a procedure for acquiring synchronization of a mobile station in a mobile communication system is described.

First of all, in order to communicate with a base station, a mobile station in a mobile communication system receives a synchronization channel (SCH) in the first place and then performs synchronization acquisition and cell search for smooth data transmission and reception with the base station using information carried on the synchronization channel (SCH).

A mobile station acquires synchronization from a base station and obtains a cell ID of a cell to which the mobile station belongs. This procedure is called a cell search. The cell search is classified into an initial cell search and a neighbor cell search. In this case, the initial cell search is performed when a mobile station initially turns on power. And, the neighbor cell search means that a connected mobile station or a mobile station in idle mode searches for a neighbor base station. In a mobile communication system, a system configuration is generally implemented based on a cell. In order to access a mobile communication service, a mobile station at a specific location matches synchronization with a base station of which signal is received with highest strength due to signal characteristics (i.e., a mobile station acquires synchronization). For this, a base station transmits a signal on a synchronization channel to enable mobile stations within a range of the base station to acquire synchronization from synchronization information of the base station. Once the mobile station matches synchronization with the base station, the mobile station is able to obtain various kinds of control informations from the base station. Afterwards, the mobile station informs the base station off a presence of the corresponding mobile station using such a means for matching uplink synchronization as a random access channel (hereinafter abbreviated RACH) and then tries a call connection with the base station. The synchronization channel is explained in detail as follows.

First of all, a synchronization channel is used for a mobile station to acquire time synchronization and frequency synchronization with a base station in the early stage of access. The synchronization channel is used for the mobile station to obtain a cell ID of the base station and additional control information in accordance with the acquired and detected time and frequency synchronizations. Thus, a process for a mobile station to acquire or obtain time and frequency synchronizations with a base station, a cell ID of the base station and relevant additional control information is performed via a synchronization channel. And, a synchronization acquiring process of a mobile station can be mainly divided into a step of acquiring frequency synchronization, a step of acquiring time synchronization, and a step of obtaining a cell ID of a base station.

In particular, a mobile station performs a step of performing frequency offset estimation and compensation for time and frequency synchronizations with a base station using a synchronization channel transmitted from the base station and then performs a step of obtaining a cell ID of the base station. In more particular, the cell ID obtaining step includes the steps of performing frame synchronization by searching a cyclic prefix (CP) of a transmission frame of a physical channel carrying the synchronization channel and obtaining a cell group ID and cell ID included in the synchronization channel. If necessary, the cell ID obtaining step can further include the steps of searching an antenna configuration included in the synchronization channel and searching a downlink (DL) frequency hopping indication which is one example of frequency configuration information.

Moreover, the mobile station is able to recheck the cell ID obtained in the previous step using such a reference signal as a DL pilot signal transmitted from the base station for more accurate cell ID security in performing a cell search.

However, as mentioned in the foregoing description, a synchronization acquisition of a mobile station needs a multi-step acquiring procedure. For this, a synchronization channel needs to be subdivided to fit the respective the steps. Specifically, in consideration of a processing by a multicarrier symbol unit in case of a mobile communication system using a multicarrier, the subdivided synchronization channel needs to be allocated to a minim radio resource region.

SUMMARY OF THE INVENTION

Accordingly, the present invention is directed to a method of generating data and transmitting a synchronization channel in a multicarrier multiple access communication system that substantially obviates one or more of the problems due to limitations and disadvantages of the related art.

As mentioned in the foregoing a multi-step description, the synchronization acquisition needs a multi-step acquisition process. For this, a synchronization channel should be subdivided to fit for each of the steps. Specifically, in case of a mobile communication system using a multicarrier, the subdivided synchronization channel needs to be allocated to a minimum radio resource region in aspect of a characteristic of the processing by a multicarrier symbol unit.

An object of the present invention is to provide a method of generating data having high transmission efficiency in a mobile communication system.

Another object of the present invention is to provide a method of generating and transmitting a synchronization channel including at least one sub-synchronization channel in a mobile communication system using a multicarrier.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, proposed is a method of generating a multicarrier symbol including at least two multicarrier sub-symbols in a mobile communication system using a multicarrier transmission scheme. In this case, the multicarrier sub-symbol (hereinafter named a subsymbol) is a sort of a multicarrier symbol in a mobile communication system using a multicarrier transmission scheme proposed by the present invention and means a multicarrier symbol made to occupy a time or frequency region smaller than that of a related art multicarrier symbol or a multicarrier symbol combined by a code division multiplexing scheme by occupying the same time or frequency region. Therefore, the related art multicarrier symbol can include at least two subsymbols proposed by the present invention.

For this, at least two subsymbols can be multiplexed to be allocated to a radio resource region for one multicarrier symbol. A multiplexing scheme for combining the at least two subsymbols includes one of a time division multiplexing (hereinafter abbreviated TDM) scheme, a frequency division multiplexing (hereinafter abbreviated FDM) scheme and a code division multiplexing (hereinafter abbreviated CDM) scheme.

To achieve these and other advantages and in accordance with the purpose of the present invention, as embodied and broadly described, a method of transmitting a synchronization channel in a wireless communication system using a multicarrier according to the present invention includes the steps of generating one synchronization channel including a plurality of sub-synchronization channels and transmitting a plurality of the sub-synchronization channels by multiplexing a plurality of the sub-synchronization channels together using one scheme of time division multiplexing (TDM), frequency division multiplexing (FDM), and code division multiplexing (CDM) schemes.

The subsymbol proposed by the embodiments of the present invention is non-limited by whether to be defined in a specific region of a time or frequency domain. In particular, a signal, which is first defined in a time domain and is then transformed into a frequency domain, or a signal, which is first defined in a frequency domain and is then transformed into a time domain, can be regarded as a signal in a finally defined region. Namely, as mentioned in the foregoing description with reference to FIG. 1, an input data sequence in a step of generating a multicarrier symbol can be interpreted in time or frequency domain. Thus, the definition is non-limited by a specific domain.

According to one embodiment of the present invention, a method for a transmitting side in a wireless communication system using a multicarrier to transmit a synchronization channel is disclosed. For this, one multicarrier symbol including at least two sub-synchronization channels is generated. The generated multicarrier symbol is transmitted to a receiving side via the synchronization channel.

According to another embodiment of the present invention, a method for a transmitting side in a wireless communication system using a multicarrier to generate a multicarrier symbol for a synchronization channel is disclosed. For this, a subsymbol related to a sub-synchronization channel corresponding to each of at least two data sequences including synchronization information is generated. Subsequently, one multicarrier symbol is generated by combining subsymbols related to the sub-synchronization channel together.

Preferably, each of the sub-synchronization channels provides at least one selected from the group consisting of information on acquisition of time and frequency synchronizations, information on antenna configuration, information on frequency bandwidth configuration and information of cell ID (identity).

Preferably, the sub-synchronization channel subsymbol is a subsymbol including synchronization and cell ID relevant information provided by the sub-synchronization channel.

Preferably, in generating the one multicarrier symbol, the subsymbols are combined by the TDM scheme.

Preferably, in generating the one multicarrier symbol, the subsymbols are combined by the FDM scheme.

Preferably, in generating the one multicarrier symbol, the subsymbols are combined by the CDM scheme.

Accordingly, the present invention provides the following effects and/or advantages.

First of all, the present invention allocates synchronization information for system synchronization and cell search to at least one sub-synchronization channel, thereby reducing complexity of a synchronization procedure.

Secondly, the present invention enables a radio resource to be efficiently used in a manner of allocating at least one sub-synchronization channel, to which the synchronization information is allocated, to a radio resource for one multicarrier symbol of a mobile communication system by a multicarrier transmission scheme using one of various multiplexing schemes, thereby raising data transmission efficiency.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In the following detailed description of the invention includes details to help the full understanding of the present invention. Yet, it is apparent to those skilled in the art that the present invention can be implemented without these details.

Embodiments proposed in the following description are applicable to such a multicarrier multiple access system considering mobility of a mobile station as a mobile communication system using OFDM (hereinafter named an OFDM mobile communication system) and the like. And, those embodiments are applicable to MC-CDMA (multicarrier-CDMA), SC-FDMA (single carrier-FDMA), WH-FDMS (Walsh Hadamard-FDMS), DFT (discrete Fourier transform) spread OFDMA and the like.

The present invention is applicable to such a system according to a standard for OFDM mobile communication systems as IEEE 802.16e system, IEEE 802.16m system and the like [cf. related standards of IEEEStd 802.16e-2005, http://www.ieeee802.org/16/published.htmi]. And, the present invention is applicable to such a similar mobile communication system as E-UTRAN (evolved universal terrestrial radio access) called LTE (long term evolution). Moreover, the present invention is applicable to such IMT-A system as LTE-A (long term evolution-advanced) system. Furthermore, the present invention is applicable to various communication systems adopting a single- or multi-antenna scheme.

Generally, a communication system is widely deployed to provide various communication services of audio, packets, data and the like. This technology is usable for downlink and/or uplink. The downlink means a communication from a base station to a mobile station, while the uplink means a communication from a mobile station to a base station. A base station generally includes a network except a mobile station in a communication system including upper layers as well as a physical transmit stage as a fixed point communicating with a mobile station. Therefore, in the present invention, a network or a base station is a counterpart of a mobile station and each of the network and the base station can have the same meaning. Besides, a mobile station is set stationary or can have mobility.

Figure 2:
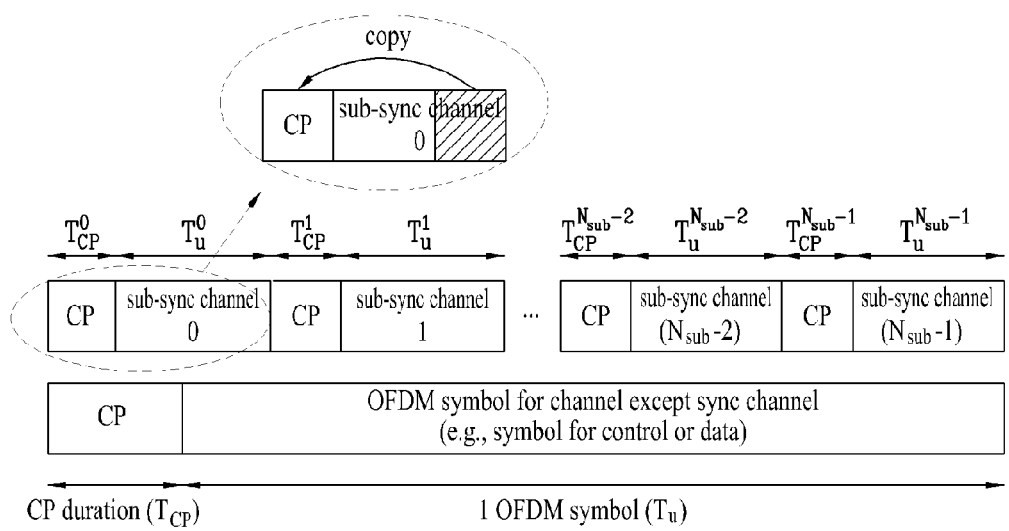
FIG. 2 is a diagram for one example of a method of generating a multicarrier symbol including at least two subsymbols combined by TDM scheme according to one embodiment of the present invention.

FIG. 2 is a diagram for one example of a method of generating a multicarrier symbol including at least two subsymbols combined by TDM scheme according to one embodiment of the present invention.

Referring to FIG. 2, according to an embodiment of the present invention, at least two subsymbols are combined, i.e., multiplexed, together by TDM scheme in a time domain allocated to one symbol. In this case, the each of the subsymbols is configured adjacent to each other in the time domain or can be configured to be spaced apart from each other. In the following description, symbols used by the present embodiment for multiplexing subsymbols by TDM scheme are defined.

Tu: Length of a multicarrier symbol carried on a control or data channel in a mobile communication system using a multicarrier according to a related art.

Tcp: Length of a cyclic prefix (CP) for a multicarrier symbol carried on a control or data channel in a mobile communication system using a multicarrier according to a related art Nsub: Number of subsymbols to be multiplexed in a single multicarrier symbol $T_u^n$: Duration of $n^{th}$ subsymbol included in a single multicarrier symbol, $T_u^n \geq 0$ $T_{cp}^n$: Length of CP of $n^{th}$ subsymbol included in a single multicarrier symbol, $T_{cp}^n \leq 0$ Meanwhile, in order to multiplex one or more subsymbols within a single symbol by TDM scheme, two schemes are available as follows.

1) TDM Scheme 1

A sum of durations of subsymbols is equal to a sum of durations of a previous general multicarrier symbol and CP. This corresponds to Formula 2. In this case, the previous general multicarrier symbol means a multicarrier symbol according to a related art to deliver control information or data instead of a symbol including multiplexed subsymbols of the present invention.

$$T_u + T_{CP} = \sum_{n=0}^{Nsub-1} (T_{CP}^n + T_u^n) \qquad \text{[Formula 2]}$$

2) TDM Scheme 2

A sum of durations of subsymbols is equal to a sum of duration of a previous general multicarrier symbol. This corresponds to Formula 3.

$$T_u = \sum_{n=0}^{Nsub-1} (T_{CP}^n + T_u^n) \qquad \text{[Formula 3]}$$

Particularly, FIG. 2 shows one example of multicarrier symbol generating method using a TDM Scheme 1 among multicarrier symbols generating methods according to one embodiment of the present invention. A plurality of subsymbols are multiplexed by TDM scheme within a single multicarrier symbol. In this case, a sum of total durations of subsymbols including CP is equal to a length of a multicarrier symbol for general data or control symbol.

Although a symbol duration $T_u^n$ of $n^{th}$ subsymbol in Formula 2 or Formula 3 or a CP duration $T_{cp}^n$ of the $n^{th}$ subsymbol has the same value or can have a different value.

Moreover, it is not mandatory that each subsymbol is relevant to the same information. Instead, each symbol may play a different role. In particular, a prescribed subsymbol can be carried one of a broadcast channel, a data channel or a control channel including a sync channel. A CP part is padded with zero(s) to be used as a guard interval (or guard time). Alternatively, one of subsymbols right behind the CP is selected and a specific part of the selected subsymbols is copied to use.

Alternatively, a rear portion of each subsymbol is copied to use [cyclic copy].

Figure 3:
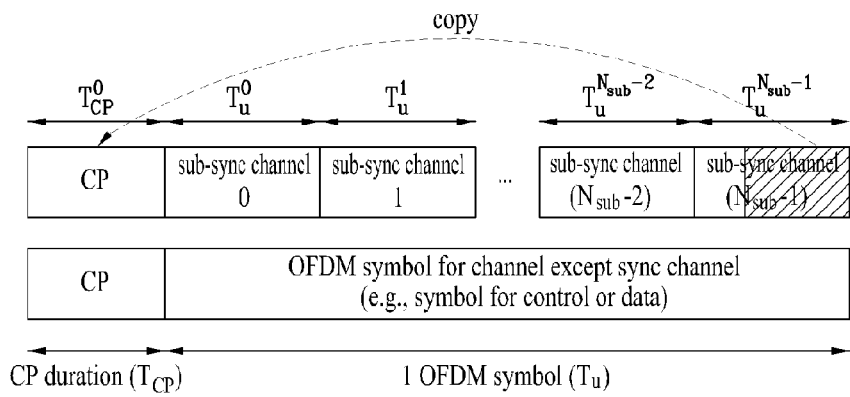
FIG. 3 is a diagram for another example of a method of generating a multicarrier symbol using TDM scheme 1 according to one embodiment of the present invention.

FIG. 3 is a diagram for another example of a method for generating a multicarrier symbol using TDM scheme 1 according to one embodiment of the present invention.

Referring to FIG. 3, unlike the former case shown in FIG. 2, CP is not located between adjacent subsymbols. Yet, a single CP is provided to the head of the combined subsymbols. This CP is generated by copying a specific portion of a last subsymbol shown in FIG. 3 (i.e., a last portion in FIG. 3). Alternatively, CP part can be nullified by setting all to zero, as shown in FIG. 2, or can include a specific portion of another subsymbol. Alternatively, a last specific portion of a first subsymbol, as shown in FIG. 4, can be allocated as a CP.

Figure 4:
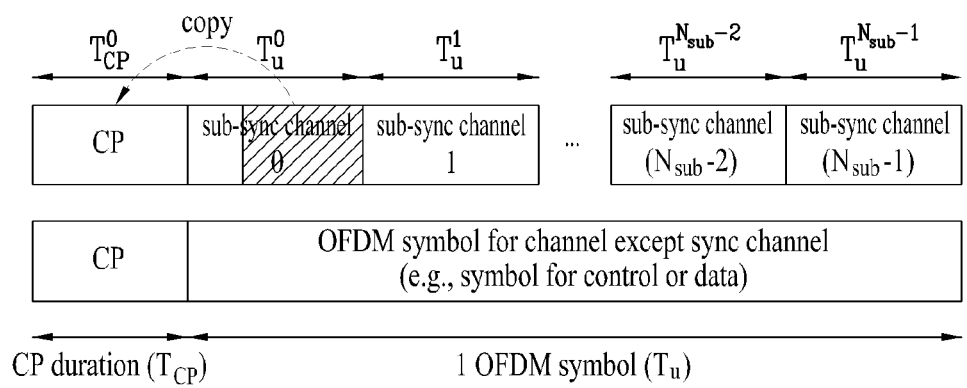
FIG. 4 is a diagram for one example of a method of generating a multicarrier symbol using TDM scheme 1 according to another embodiment of the present invention.

FIG. 4 is a diagram for one example of a method of generating a multicarrier symbol using TDM scheme 1 according to another embodiment of the present invention.

Figure 5:
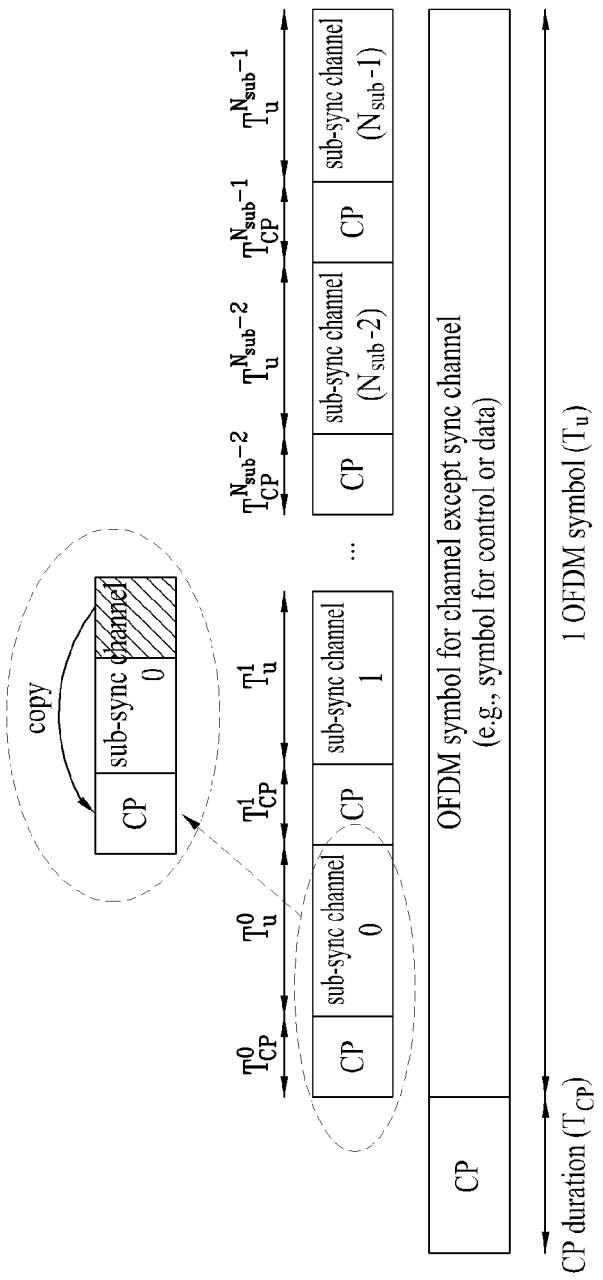
FIG. 5 is a diagram for another example of a method of generating a multicarrier symbol using TDM scheme 2 according to another embodiment of the present invention.

FIG. 5 is a diagram for another example of a method of generating a multicarrier symbol using TDM scheme 2 according to another embodiment of the present invention.

Referring to FIG. 5, a plurality of subsymbols are combined by TDM. And, a length corresponding to a sum of total durations of subsymbols including CP is allocated at each subsymbol (e.g., in case of FIG. 5, a last portion of a corresponding subsymbol is copied) is equal to a length of the aforesaid previous general multicarrier symbol. Moreover, a content and length of CP, a length of subsymbol and information to deliver are identical to those of the former example shown in FIG. 2.

Figure 6:
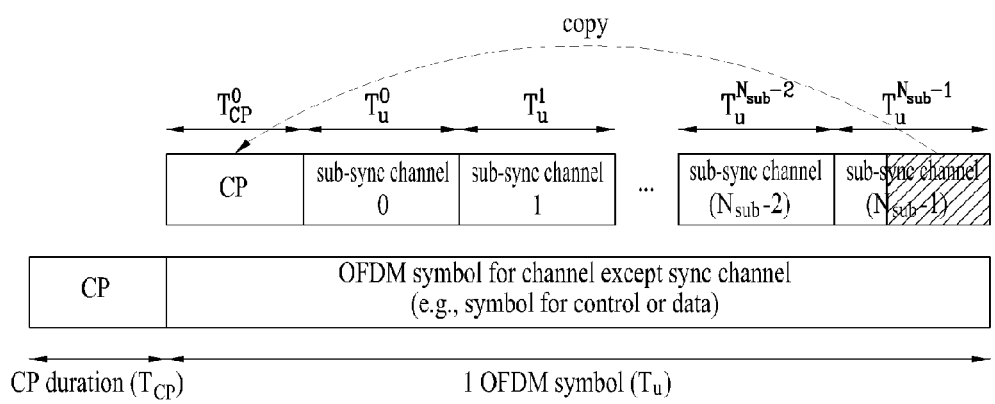
FIG. 6 is a diagram for another example of a method of generating a multicarrier symbol using TDM scheme 2 according to another embodiment of the present invention.

FIG. 6 is a diagram for another example of a method of generating a multicarrier symbol using TDM scheme 2 according to another embodiment of the present invention.

Referring to FIG. 6, subchannels are adjacent to each other without CP. Yet, a single CP is located at the head of the subchannels combined together by TDM scheme. This CP is copied from (Nsub−1)$^{th}$ subsymbol, which is the last subsymbol. Of course, a subsymbol, including a CP attempts to copy, needs not to be fixed to a subsymbol at a specific location and can be changed. Unlike the case shown in FIG. 6, FIG. 7 shows a case of copying a CP from a last specific portion of a first subsymbol.

Figure 7:
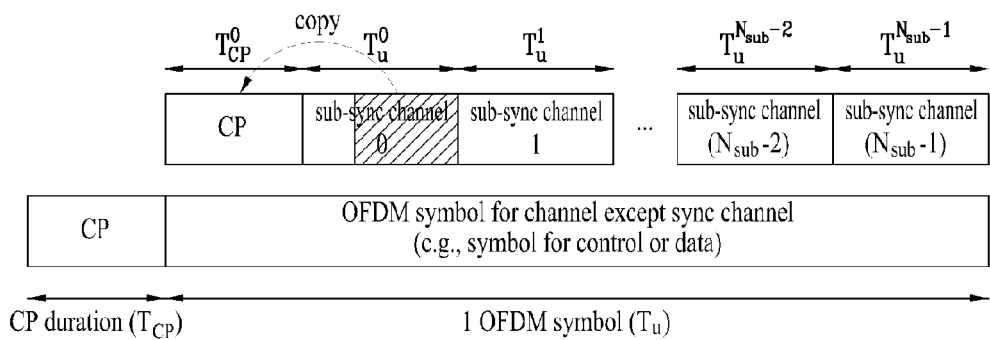
FIG. 7 is a diagram for a further example of a method of generating a multicarrier symbol using TDM scheme 2 according to another embodiment of the present invention.

FIG. 7 is a diagram for a further example of a method of generating a multicarrier symbol using TDM scheme 2 according to another embodiment of the present invention.

Figure 8:
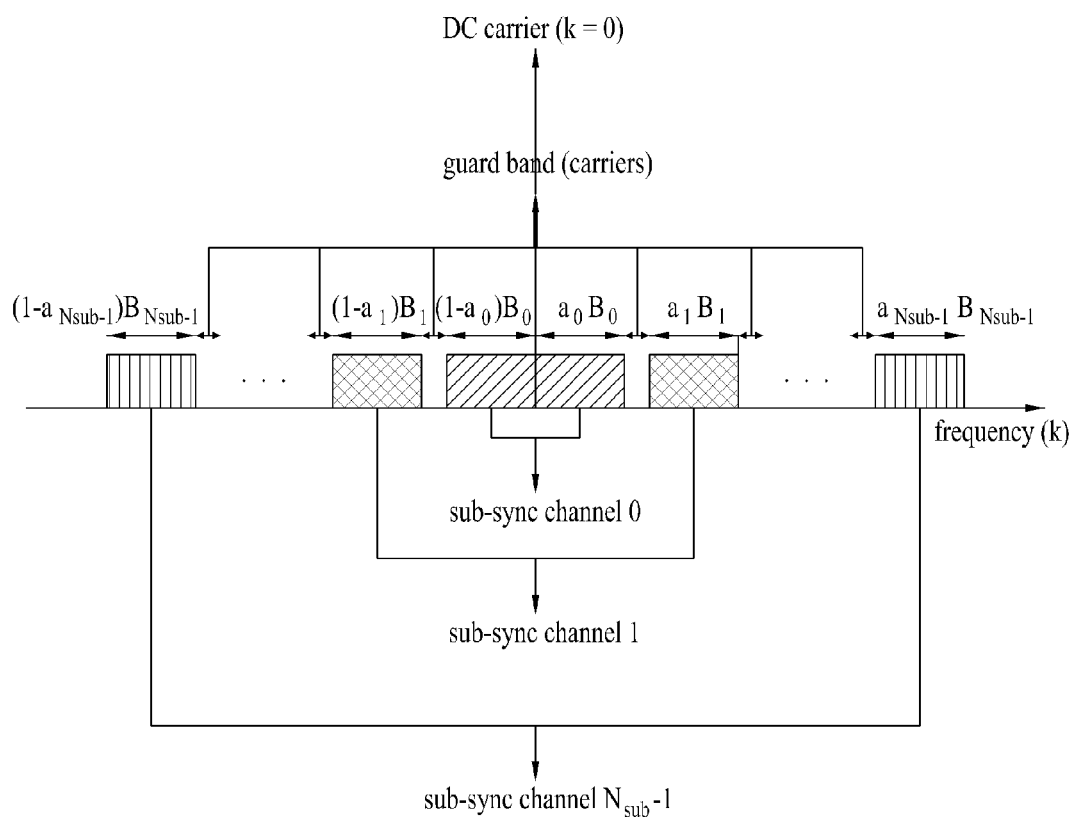
FIG. 8 is a diagram for one example of a method of generating a multicarrier symbol using FDM scheme according to a further embodiment of the present invention.

FIG. 8 is a diagram for one example of a method of generating a multicarrier symbol using FDM scheme according to a further embodiment of the present invention. A further embodiment of the present invention proposes that at least two subsymbols allocated to a single symbol are multiplexed by FDM in frequency domain.

Embodiments described with reference to FIGS. 8 to 12 relate to FDM scheme. A terminology 'subsymbol' is suitable in aspect of time-axis domain in general. In aspect of a frequency axis, a subchannel is substituted for the subsymbol to use for application of the present invention.

In this case, each of the subchannels is configured adjacent to each other on a frequency band or can be configured to be spaced apart from each other. A frequency band to be allocated as subchannels can be allocated according to a specific allocation rule. In a scheme of combining subchannels by FDM according to a further embodiment of the present invention, a subchannel is allocated by using a scaling factor centering on a center frequency on a frequency band allocated to a symbol. In the following description, symbols used for the following embodiments are defined.

an: Scaling factor for n$^{th}$ subchannel (0≤an≤1)
Bn: Frequency bandwidth allocated to n$^{th}$ subchannel Referring to FIG. 8, 1$^{st}$ subchannel is allocated to an intermediate frequency (e.g., DC carrier in FIG. 8) on a frequency band allocated to a single multicarrier symbol. Next subchannels are allocated to left and right bands adjacent to the intermediate frequency by one frequency interval, respectively. In this case, one subchannel, as shown in FIG. 8, is divided into two parts by a scaling factor and allocated. An n$^{th}$ subsymbol is allocated to a frequency band of Bn. In particular, one subchannel is divided and allocated to left and right to a center frequency by a scaling factor except 1$^{st}$ subchannel corresponding to subchannel 0. In case of the embodiment shown in FIG. 8, subchannel 1 corresponding to a 2$^{nd}$ subchannel is allocated to left and right sides in a manner of being divided by leaving a subchannel 0 and a prescribed guard band centering on a center frequency.

Referring to FIG. 8, a frequency amounting to total B1 is allocated to the subchannel 1. In particular, a frequency amounting to (1-a1)B1 is allocated to the subchannel 1 located to a left side next to the center frequency, while a frequency amounting to a1B1 is allocated to the subchannel 1 located to a right side next to the center frequency. And, frequencies are allocated to the rest of subchannels in the same manner. Thus, if FDM is performed by allocating subchannels by a scaling factor scheme centering on a center frequency, when a mobile station receives a communication service by moving away from one base station to another (particularly, the mobile station moves between base stations of heterogeneous mobile communication systems), a bandwidth for a single symbol is variably allocated to be suitable for a corresponding operational status of each base station or each system. So, when an OFDM symbol is transmitted to a corresponding mobile station, the mobile station searches a subchannel from a prescribed minimum frequency band centering on a center frequency and then further searches subchannels by extending a frequency band by a prescribed frequency unit. Therefore, the mobile station is able to cope with a case that a frequency region is variable allocated.

Figure 9:
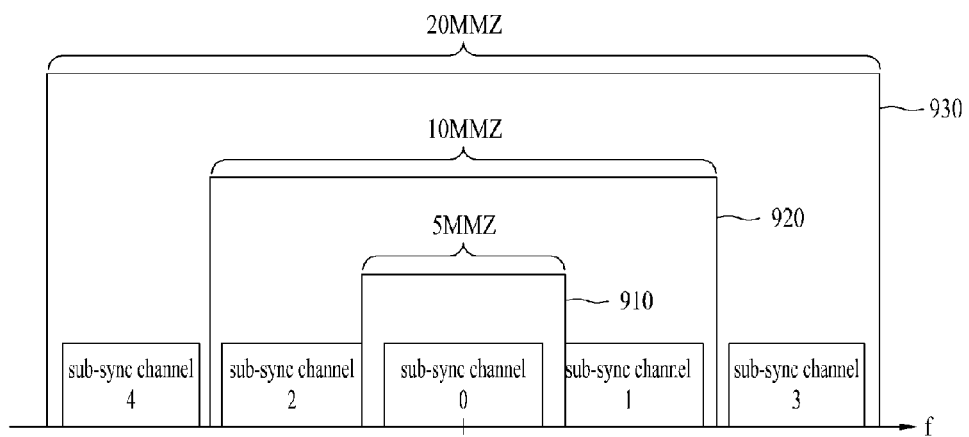
FIG. 9 is a diagram for a method of searching a frequency band of a mobile station in FDM scheme according to a further embodiment of the present invention.

FIG. 9 is a diagram for a method of searching a frequency band of a mobile station in FDM scheme according to a further embodiment of the present invention.

Referring to FIG. 9, in case that frequency bands 5 MHz, 10 Mz and 20 MHz are allocated per system (or for a single system) to a single symbol, a mobile station preferentially searches a 5 MHz band 910 centering on a center frequency. If the mobile station needs to search frequency bands by extending frequency bands, the mobile station searches frequency bands in a manner of extending the frequency bands to a 10 MHz frequency band 920 and a 20 MHz frequency band 930 gradually. Through this, the mobile station is able to efficiently receive data such that power efficiency of the mobile station raise. Besides, several adjacent carriers including a DC carrier corresponding to a center frequency can be utilized as a guard band for DC offset protection [not shown in the FIG. 8].

Figure 10:
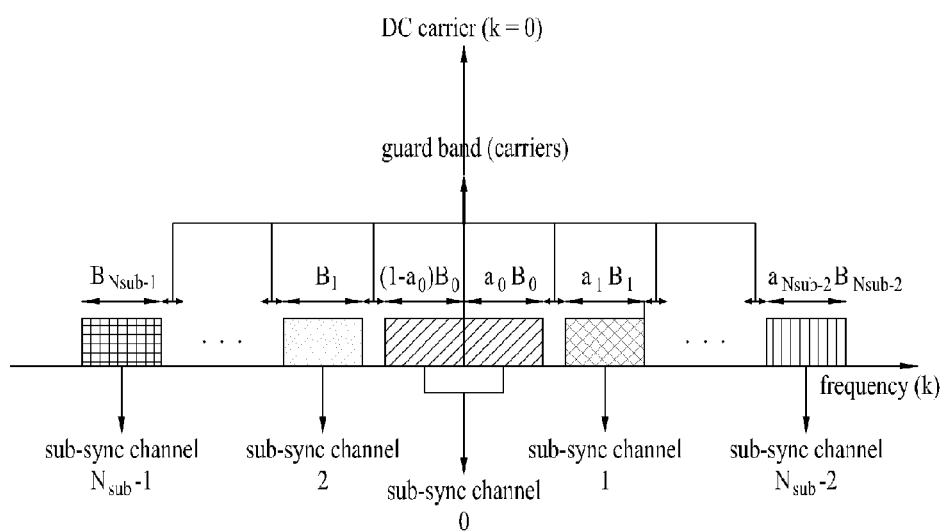
FIG. 10 is a diagram for another example of a method of generating a multicarrier symbol using FDM scheme according to a further embodiment of the present invention.

FIG. 10 is a diagram for another example of a method of generating a multicarrier symbol using FDM scheme according to a further embodiment of the present invention.

Referring to FIG. 10, subchannels except a subchannel 0 exist either left or right side centering on a center frequency. For example, an odd subchannel (e.g., a subchannel 1) is located at a right side of a center frequency only, while an even subchannel (e.g., a subchannel 2) is located at a left side of a center frequency only. This location application can be performed to the contrary.

Figure 11:
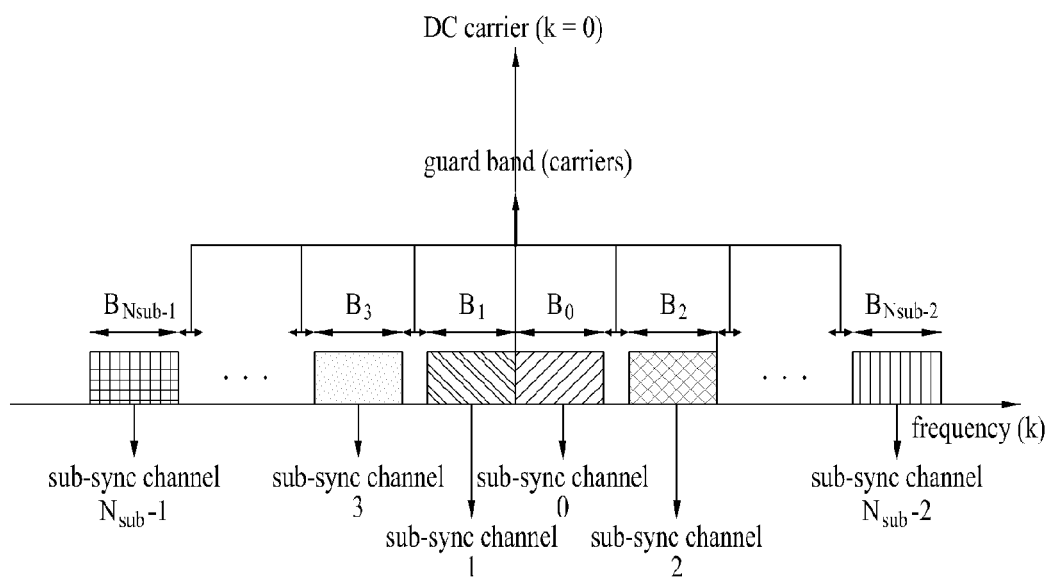
FIG. 11 is a diagram for another example of a method of generating a multicarrier symbol using FDM scheme according to a further embodiment of the present invention.

FIG. 11 is a diagram for another example of a method of generating a multicarrier symbol using FDM scheme according to a further embodiment of the present invention.

Referring to FIG. 11, even subchannels including a subchannel 0 are allocated at a right side of a center frequency, while odd subchannels are allocated at a left side of the center frequency. This location allocation of subchannels can be performed to the contrary. A subchannel 0 and a subchannel 1 shown in FIG. 11 may or may not discriminated from each other by a single DC carrier or at least two DC carriers.

Figure 12:
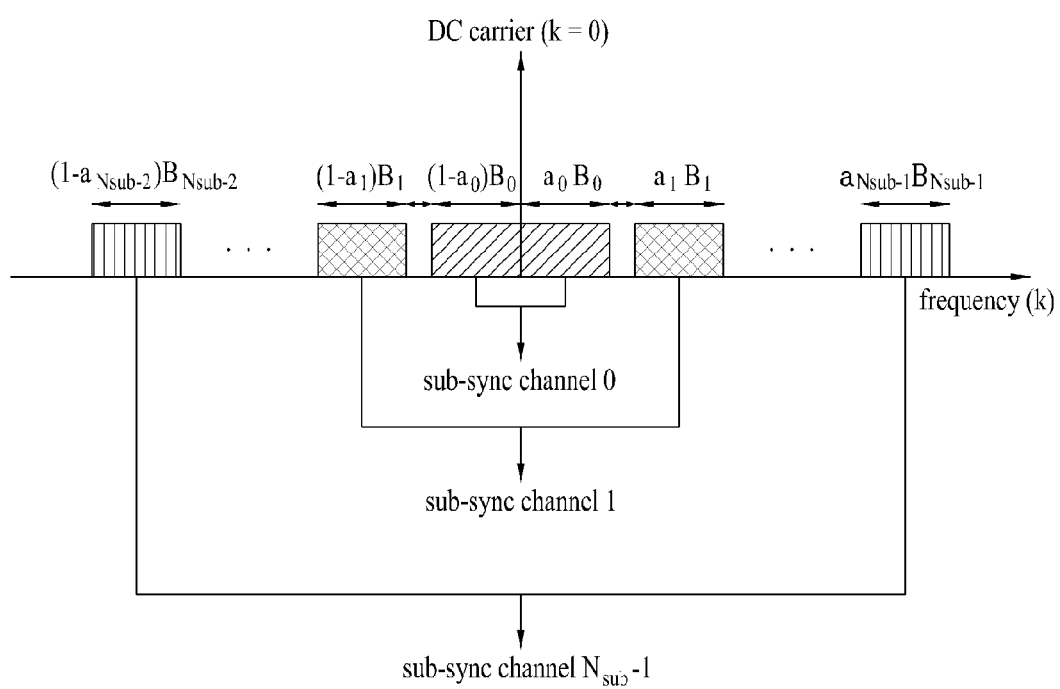
FIG. 12 is a diagram for another example of a method of generating a multicarrier symbol using FDM scheme according to a further embodiment of the present invention.

FIG. 12 is a diagram for another example of a method of generating a multicarrier symbol using FDM scheme according to a further embodiment of the present invention.

Referring to FIG. 12, although the present embodiment is similar to the former case shown in FIG. 8, the present embodiment differs from the case shown in FIG. 8 in that a guard band is not provided between subchannels. In this case, a DC carrier corresponding to a center frequency may or may not exist, which depends on a system operational status.

Figure 13:
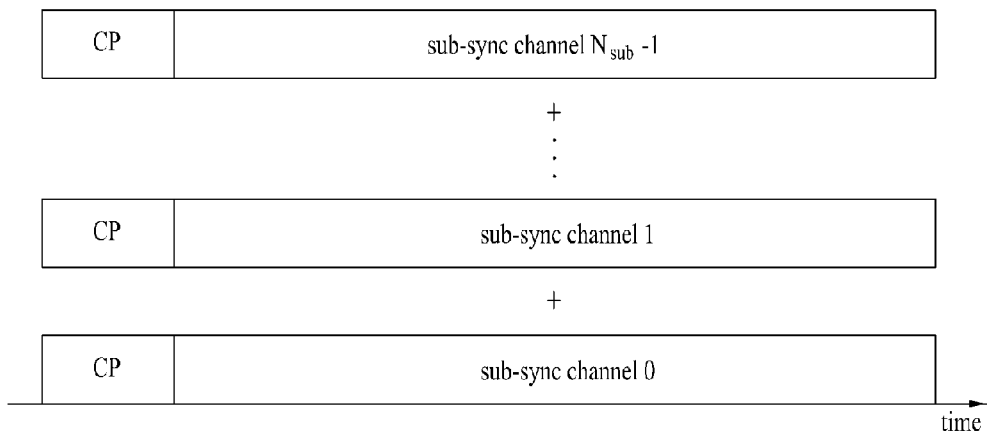
FIG. 13 is a diagram for one example of a method of generating a multicarrier symbol using CDM scheme according to a further embodiment of the present invention.

FIG. 13 is a diagram for one example of a method of generating a multicarrier symbol using CDM scheme according to a further embodiment of the present invention.

Referring to FIG. 13, at least two subsymbols are multiplexed in a time domain allocated to a single symbol by CDM scheme. In doing so, a sequence defined in the time domain is allocated to each of the subsymbols and the corresponding sequences are multiplexed together by CDM.

Embodiments described with reference to FIGS. 13 to 19 relate to CDM scheme. A terminology 'subsymbol' is suitable in aspect of time-axis domain of TDM scheme in general. Hence, a subchannel need to be substituted for the subsymbol to use for application of the present invention in aspect of the CDM scheme.

Types of sequences in the following embodiments are non-limited. For instance, a random sequence, a PN code, Golay sequence, CAZAC sequence (e.g., Zadoff-Chu, modulated Frank, GCL, etc.) and the like are available.

Referring to FIG. 13, a multicarrier symbol is generated by CDM scheme for adding subchannels by the same power ratio. The present embodiment is applicable to a case that a CP is added to each subsymbol or a case that a CP is not added to each subsymbol. Moreover, allocation may be performed with a power ratio according to significance between subchannels. This can be implemented in a manner of repeatedly generating significant subchannels. Embodiments shown in FIG. 14 and FIG. 15 are provided for the following cases.

Figure 14:
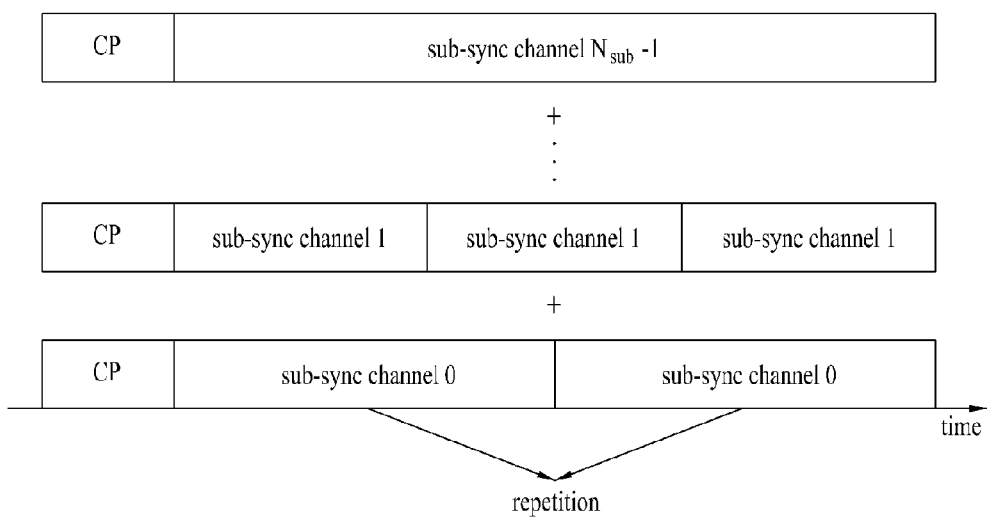
FIG. 14 is a diagram for another example of a method of generating a multicarrier symbol using CDM scheme according to a further embodiment of the present invention.

FIG. 14 is a diagram for another example of a method of generating a multicarrier symbol using CDM scheme according to a further embodiment of the present invention.

Referring to FIG. 14, in a scheme of performing CDM in time domain, subchannel 0 is twice repeated in one multicarrier symbol interval, while subchannel 1 is repeated three times. In order to implement the repetition in a predetermined interval, subchannels can be masked with PN code chips. By reflecting a significance difference between subchannels through the repetitive allocation of subchannels, it is able to generate a multicarrier symbol.

Figure 15:
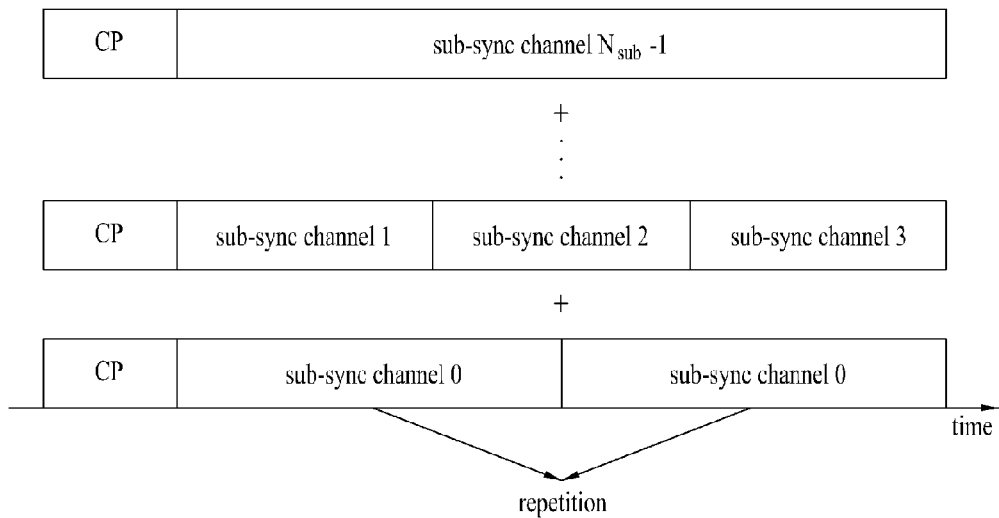
FIG. 15 is a diagram for another example of a method of generating a multicarrier symbol using CDM scheme according to a further embodiment of the present invention.

FIG. 15 is a diagram for another example of a method of generating a multicarrier symbol using CDM scheme according to a further embodiment of the present invention. Embodiment shown in FIG. 15 relates to a case that both CDM and TDM are simultaneously applied. Subchannel 0 is repeated twice, subchannels 1 to 3 are combined by TDM scheme, and they are then combined together by CDM scheme. Thus, by reflecting significance of subchannel and available resource quantity according to an operational situation of system, it is able to generate a multicarrier symbol.

Figure 16:
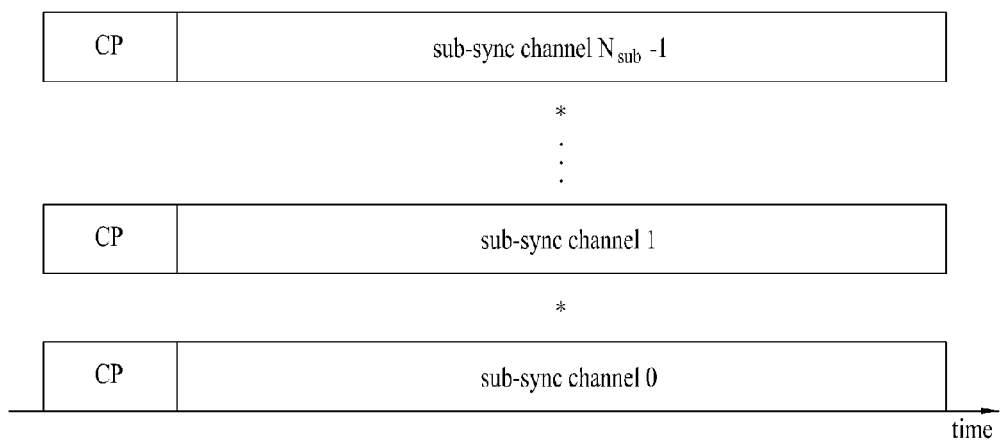
FIG. 16 is a diagram for another example of a method of generating a multicarrier symbol using CDM scheme according to a further embodiment of the present invention.

FIG. 16 is a diagram for another example of a method of generating a multicarrier symbol using CDM scheme according to a further embodiment of the present invention. Although a previous CDM scheme configures a multicarrier symbol using subchannels as an element-by-element sum, a multicarrier symbol is configured as an element-by-element multiplication between subchannels in the following embodiments. Such an inter-subchannel element-by-element multiplication is defined as scrambling. In the following description, the scrambling is executable in time domain and frequency domain both. Optionally, a power ratio different between subsymbols is allocated or simultaneous application with TDM is possible, as shown in FIG. 14 or FIG. 15. Such a case is shown in the following embodiments.

Figure 17:
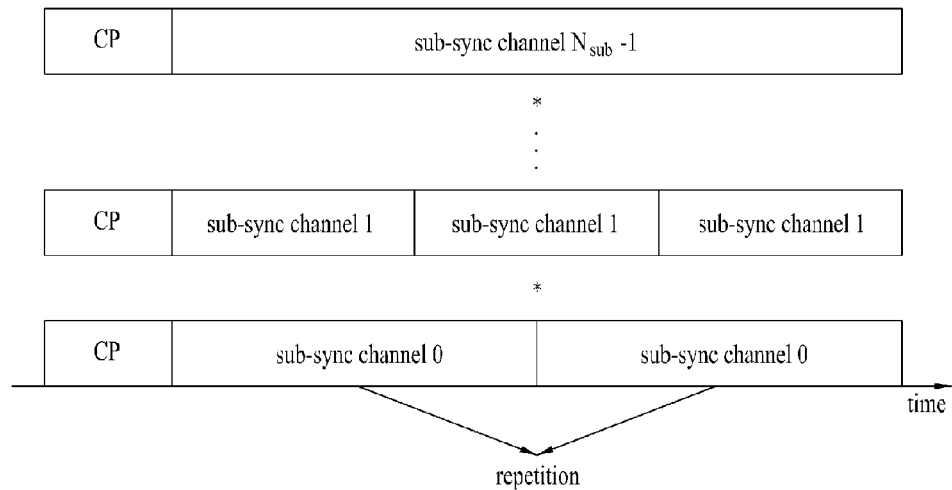
FIG. 17 is a diagram for another example of a method of generating a multicarrier symbol using CDM scheme according to a further embodiment of the present invention.

FIG. 17 is a diagram for another example of a method of generating a multicarrier symbol using CDM scheme according to a further embodiment of the present invention. Referring to FIG. 17, scrambling can be performed in a manner of configuring a power ratio different according to inter-channel significance and the like.

Figure 18:
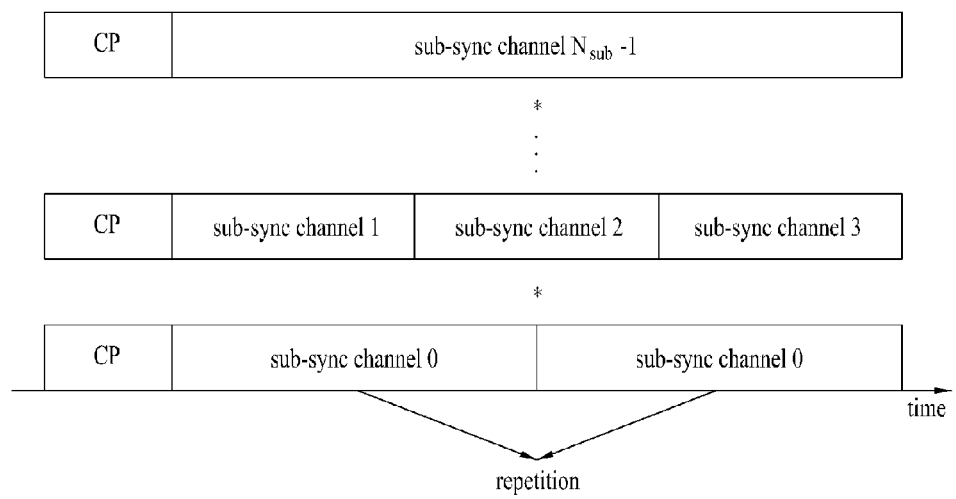
FIG. 18 is a diagram for another example of a method of generating a multicarrier symbol using CDM scheme according to a further embodiment of the present invention.

FIG. 18 is a diagram for another example of a method of generating a multicarrier symbol using CDM scheme according to a further embodiment of the present invention. Referring to FIG. 18, scrambling can be performed in a manner of configuring a power ratio different according to inter-channel significance or using TDM scheme together.

Figure 19:
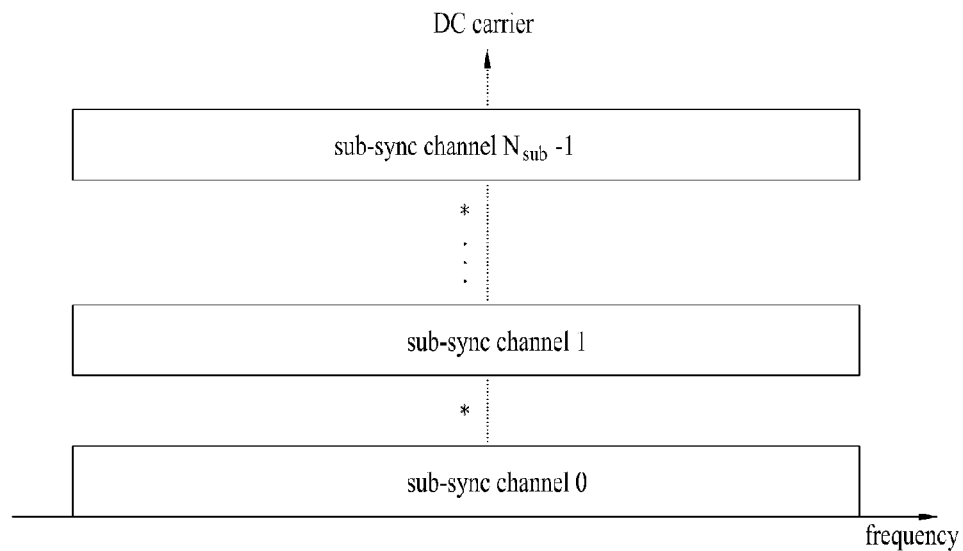
FIG. 19 is a diagram for a further example of a method of generating a multicarrier symbol using CDM scheme according to a further embodiment of the present invention.

FIG. 19 is a diagram for a further example of a method of generating a multicarrier symbol using CDM scheme according to a further embodiment of the present invention. Referring to FIG. 19, scrambling is performed between subchannels in frequency domain instead of the time domain unlike shown in one of FIGS. 16 to 18. And, the scheme shown in FIG. 17 or FIG. 18 is applicable to the present embodiment.

Figure 20:
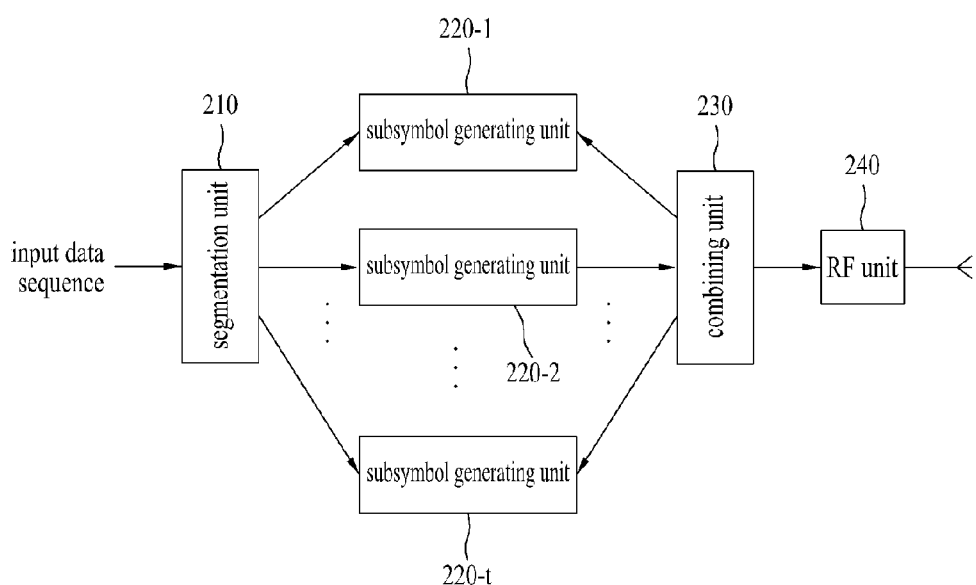
FIG. 20 is a diagram for a method of generating a multicarrier symbol including a subsymbol according to another further embodiment of the present invention.

FIG. 20 is a diagram for a method of generating a multicarrier symbol including a subsymbol according to another further embodiment of the present invention.

Referring to FIG. 20, an input data sequence $\vec{d}=[d_0, d_1, \ldots, d_{N-1}]^T$ is inputted to a segmentation unit 210. The segmentation unit 210 segments the input data sequence by a prescribed unit into t data blocks determined by a system. Unlike the above case, an input data sequence can include a plurality of segmented input data sequences. In this case, the segmentation unit is unnecessary. According to the present embodiment, assume a case that a segmentation unit for segmenting an input data sequence is provided.

Figure 1:
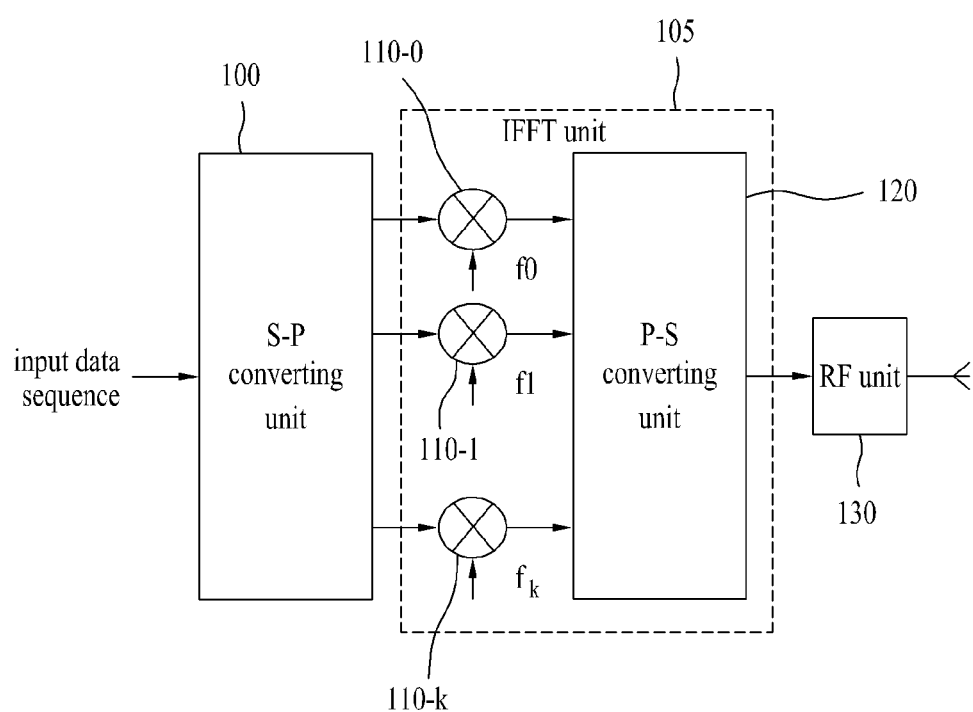
FIG. 1 is a diagram for a method of generating a signal in a transmitting side using multicarrier according to a related art.

A plurality of the segmented data blocks are inputted to subsymbol generating units 220-1 to 220-t, respectively. Each of the subsymbol generating units includes a parallel-to-serial converting unit and an IFFT unit like the former multicarrier symbol generating unit shown in FIG. 1. The subsymbols generated by the subsymbol generating units are inputted to a combining unit 230 to generate one multicarrier symbol. Each of the subsymbol generating units adds a cyclic prefix to the corresponding generated subsymbol if necessary.

The combining unit 230 multiplexes the inputted subsymbols according to one of the embodiments of the present invention shown in FIGS. 2 to 19. One multicarrier symbol generated by the combining unit 230 is transmitted on a radio channel via an RF unit 240.

In the following description, explained is an embodiment for a case that applying the former embodiments proposed in one of FIGS. 2 to 19 to generation of a sync channel in a mobile communication system using a multicarrier.

As mentioned in the foregoing description, a process for a mobile station to acquire synchronization with a base station can be mainly divided into the steps of acquiring frequency synchronization and time synchronization and acquiring a cell ID of a base station. If both a base station and a mobile station perform the whole process using one synchronization channel, it is not efficient in aspect of complexity and radio resource management. Therefore, a synchronization acquiring process is processed as a plurality of steps and control information required for each of the steps is allocated to a subsymbol.

For this, at least one sub-sync channel included in one sync channel is defined. This sub-sync channel is a channel for delivering a subsymbol including sync relevant control information.

For example of allocating sync relevant control information to transmit, one random sub-sync channel x corresponds to a subsymbol to which cell ID information is allocated and another random sub-sync channel y corresponds to a subsymbol to which cell group ID information is allocated. In this case, a mobile station preferentially acquires cell ID information of a current base station from the sub-sync channel x and also acquires cell group ID information (or partial cell ID information) via the sub-sync channel y. Using the two informations, the mobile station is able to structurally acquire the cell ID information and the cell group ID information. For instance, if 3 cell ID informations are allocated to a subsymbol corresponding to a sub-sync channel x and 170 cell group ID informations are allocated to a subsymbol corresponding to a sub-sync channel y, it is able to represent total 510 (=3*170) cell IDs using the sub-sync channel x and the sub-sync channel y. Besides, a sub-sync channel can correspond to a subsymbol to which information on antenna configuration (or information on the number of antennas used for a sync channel or other channels), information on bandwidth allocation, information on CP configuration, information on various modes, information on MIMO operation scheme or the like is allocated.

A case of applying the present invention to a sync acquiring process is described as follows. First of all, in a plurality of the steps for the sync acquisition, sub-sync channel 0 corresponds to a subsymbol for time and frequency sync acquisition relevant information, sub-sync channel 1 corresponds to a subsymbol for cell ID identification relevant information, sub-sync channel 2 corresponds to a subsymbol for cell group ID relevant information, sub-sync channel 3 corresponds to a subsymbol for antenna configuration relevant information, and sub-sync channel 4 corresponds to a subsymbol for bandwidth configuration relevant information. Thus, in case that sync relevant information is delivered via a sub-sync channel corresponding to each subsymbol using at least two subsymbols, like the former embodiments shown in FIGS. 2 to 19, it is able to generate one multicarrier symbol by combining sub-sync channels corresponding to each of the subsymbols together by TDM, FDM or CDM scheme.

When the above-generated multicarrier symbol is transmitted to a receiving side via a synch channel, it is able to obtain effect of time diversity, frequency diversity or code diversity in transmission. And, a sync channel may ne transmitted by differentiating a power ratio per sub-sync channel according to significance. Moreover, it is able to perform multicarrier symbol transmission to avoid influence of channel distortion attributed to interference and multipath by allocating guard interval (e.g., guard time, guard frequency band, etc.) and CP per sub-sync channel. Moreover, a sub-sync channel corresponding to a subsymbol corresponding to system information or emergency message information and a sub-sync channel corresponding to a subsymbol relevant to the above sync information are multiplexed together and can be then sent simultaneously.

Figure 21:
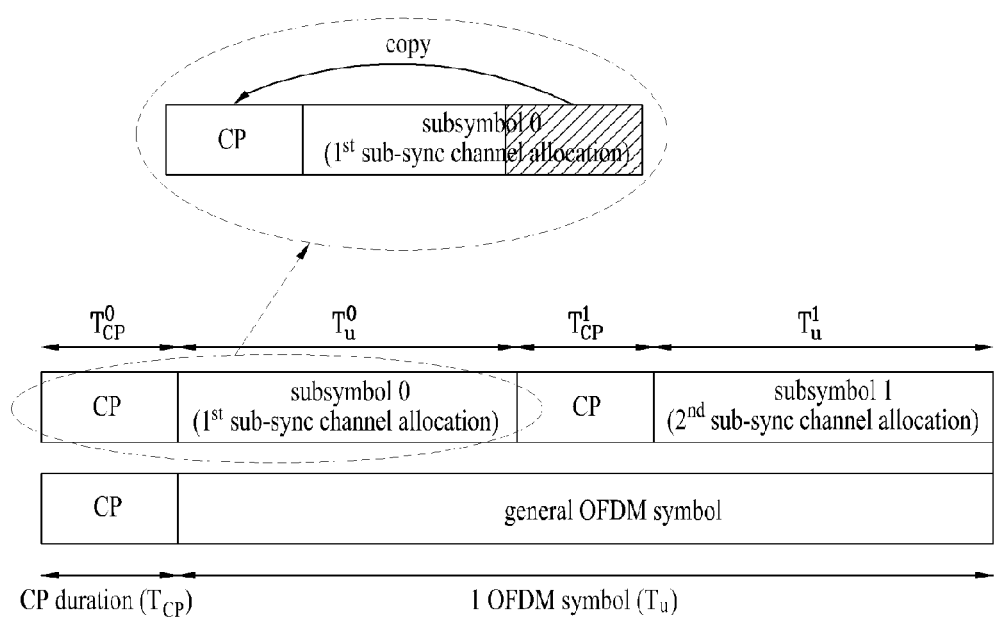
FIG. 21 is a diagram for a method of generating a synchronization channel according to one embodiment of the present invention.
Figure 22:
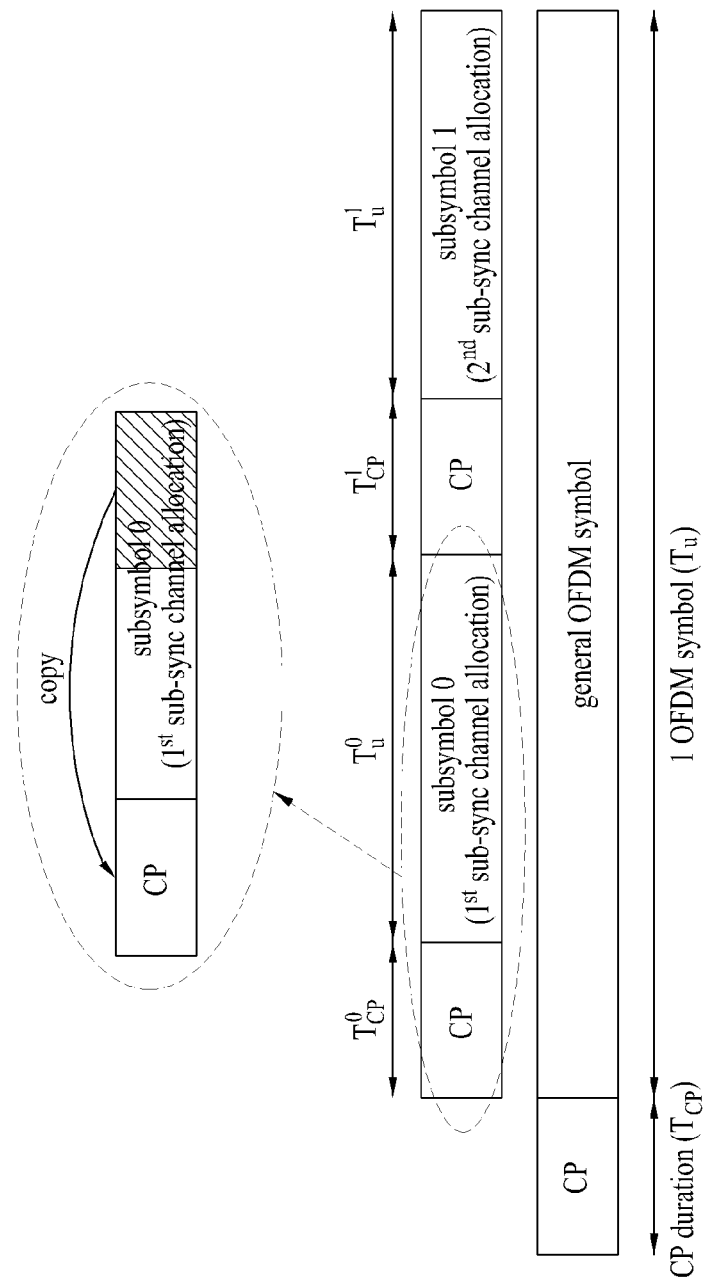
FIG. 22 is a diagram for a method of generating a synchronization channel according to another embodiment of the present invention.

FIG. 21 and FIG. 22 are a diagram for a method of generating a synchronization channel according to one embodiment of the present invention, respectively.

In particular, an embodiment shown in FIG. 21 relates to a method of generating a sync channel using the above-described sub-sync channel using the method proposed by the embodiment shown in FIG. 2. In more particular, this embodiment relates to a method of using two subsymbols equal to each other in length.

As mentioned in the foregoing description, a sync channel can include time and frequency acquisition relevant information, cell ID identification relevant information, cell group ID relevant information, antenna configuration relevant information and frequency bandwidth configuration information. According to an operational method of system, it is able to allocate sync channel relevant information to subsymbol 0 and subsymbol 1. For instance, time and frequency sync acquisition relevant information is allocated to subsymbol 0, while the rest of sync channel relevant information is allocated to subsymbol 1.

In particular, an embodiment shown in FIG. 22 relates to a method of generating a sync channel using the above-described sub-sync channel using the method proposed by the embodiment shown in FIG. 5. In more particular, this embodiment relates to a method of using two subsymbols equal to each other in length. A detailed subsymbol allocation method can use the former method proposed by the former embodiment shown in FIG. 21.

The two subsymbols of the embodiments shown in FIG. 21 and FIG. 22 are equal to each other in length and include sync channel relevant information. Alternatively, the two subsymbols can be set to differ from each other in length or can include information (e.g., broadcast relevant information, data channel relevant information, etc.) different from the synch channel relevant information. Alternatively, the information different from the sync channel relevant information can be used in a manner of being allocated to a different subsymbol.

Figure 23:
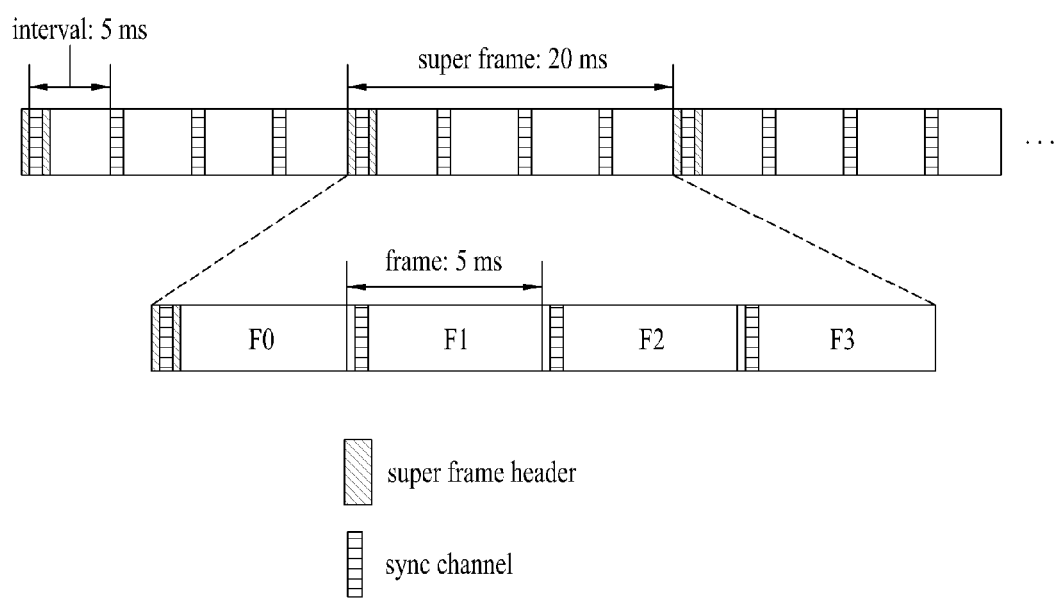
FIG. 23 is a diagram for a method of transmitting a synchronization channel according to a further embodiment of the present invention.

FIG. 23 is a diagram for a method of transmitting a synchronization channel according to a further embodiment of the present invention. In particular, FIG. 23 shows a method of allocating at least two sub-sync channels for transmitting a sync channel in IEEE 802.16m system according to an embodiment of the present invention. Generally, a frame structure of IEEE 802.16m includes one super frame constructed with 4 frames, each of which includes 8 subframes. Each super frame can include control information called a super-frame header (SFH), which is just exemplary. The present invention is applicable to various sizes of super frame and subframe as well.

Each sync channel within a frame can include one OFDM symbol as an example of a multicarrier scheme. Each OFDM symbol can include at least two subsymbols proposed by one of the embodiments of the present invention shown in FIGS. 2 to 19. And, the sub-sync channel shown in FIG. 21 or FIG. 22 can be allocated to each subsymbol.

In IEEE 802.16m system, an OFDM symbol on initial synchronization and cell information or an additional sync relevant OFDM symbol for synchronization and cell information in handover can exist in each frame, which is called a hierarchical structure. Alternatively, this OFDM symbol can be transmitted in a non-hierarchical structure which is the simplest form.

Meanwhile, the present invention is applicable to enable interoperation with IEEE 802.16e system. In general, in the IEEE 802.16e system, sync relevant information is carried on a preamble and a sync channel is configured to be repeated on a time axis. In case that the present invention is applied to IEEE 802.16m, it is able to load a signal for a sync channel on each specific position of a carrier to indicate a repeated pattern of a sync channel on a time axis. In this case, the sync channel includes at least two sub-sync channels of which characteristics are described with reference to FIG. 21 and FIG. 22.

In order to achieve interoperation between IEEE 802.16m system and IEEE 802.16e system, in case that sync channels for the respective systems are transmitted by being mixed together by TDM scheme, the sync channel of the IEEE 802.16m system can be transmitted in a manner of having a repetitive pattern, which is relatively prime with that of the IEEE 802.16e system, to avoid collision with a preamble signal of the IEEE 802.16e system.

In the above detailed description of the present invention, a communication performing process between a transmitting side and a receiving side is mainly explained to help the understanding of the present invention and its embodiments. Alternatively, the transmitting side can include a mobile station or a base station of a network and the receiving side can include the base station of the network or the mobile station. Terminologies used in this disclosure can be replaced by different terminologies having the same meanings, respectively. For instance, a terminal is replaced by a mobile station, a mobile terminal, a communication terminal, a user equipment, a user device or the like and a base station can be replaced by a fixed station, a Node B (NB), an eNB or the like.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Accordingly, a data generating method and a sync channel transmitting method in a multicarrier multiple access communication system according to the present invention are industrially applicable.

What is claimed is:

1. A method of transmitting a synchronization channel in a wireless communication system using a multicarrier, the method comprising:

generating a first orthogonal frequency division multiplexing (OFDM) symbol, the first OFDM symbol including a cyclic prefix and a first set of consecutive sub-synchronization elements in a time domain;

generating a second OFDM symbol, the second OFDM symbol including a cyclic prefix and a second set of consecutive sub-synchronization elements in the time domain;

generating a synchronization channel by element-by-element multiplication of the first OFDM symbol and the second OFDM symbol in the time domain; and transmitting the synchronization channel, wherein each of the OFDM symbols provides at least one information on acquisition of time and frequency synchronizations, information on antenna configuration, information on frequency bandwidth configuration and information of cell ID (identity).

2. The method of claim 1, wherein a plurality of the sub-synchronization elements are adjacent to or spaced apart from each other.

3. The method of claim 2, wherein a sub-element different from the sub-synchronization elements is generated among a plurality of the sub-synchronization elements.

4. A device configured to transmit a synchronization channel in a wireless communication system using a multicarrier, comprising:

a transmitter configured generate a first orthogonal frequency division multiplexing (OFDM) symbol, the first OFDM symbol including a cyclic prefix and a first set of consecutive sub-synchronization elements in a time domain, generate a second OFDM symbol, the second OFDM symbol including a cyclic prefix and a second set of consecutive sub-synchronization elements in the time domain, generate a synchronization channel by element-by-element multiplication of the first OFDM symbol and the second OFDM symbol in the time domain, and transmit the synchronization channel, wherein each of the OFDM symbols provides at least one information on acquisition of time and frequency synchronizations, information on antenna configuration, information on frequency bandwidth configuration and information of cell ID (identity).

* * * * *